(12) United States Patent  (10) Patent No.: US 7,449,810 B2
Yokota et al.  (45) Date of Patent: Nov. 11, 2008

(54) ELECTRIC MOTOR AND ELECTRIC TOOL HAVING THE MOTOR

(75) Inventors: Tomoyoshi Yokota, Hitachinaka (JP); Teruo Imai, Hitachinaka (JP); Satoru Gunji, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 380 days.

(21) Appl. No.: 11/299,700

(22) Filed: Dec. 13, 2005

(65) Prior Publication Data

US 2006/0125344 A1 Jun. 15, 2006

(30) Foreign Application Priority Data

Dec. 15, 2004 (JP) ............................ P2004-362574

(51) Int. Cl.
*H02K 23/00* (2006.01)

(52) U.S. Cl. ..................................................... 310/264

(58) Field of Classification Search ........... 310/40 MM, 310/43, 90, 192–194, 214, 235, 270–271
See application file for complete search history.

(56) References Cited

U.S. PATENT DOCUMENTS 3,315,105 A * 4/1967 Moore, Jr. .................. 310/211
4,063,123 A * 12/1977 Herr et al. ................... 310/270
4,967,111 A * 10/1990 Andrieux et al. .............. 310/90
5,304,885 A * 4/1994 Wong et al. .................. 310/216
5,449,963 A * 9/1995 Mok ........................... 310/270
6,707,198 B1 * 3/2004 Debelius ...................... 310/90

FOREIGN PATENT DOCUMENTS

JP 1-283037 11/1989
JP 2002-186216 6/2002

* cited by examiner

*Primary Examiner*—Tran Nguyen
(74) *Attorney, Agent, or Firm*—Antonelli, Terry, Stout & Kraus, LLP.

(57) ABSTRACT

In a circular saw, an end plate provided on an end of a rotor core has a cylindrical shaft insulator and a plate extending radially from the shaft insulator. The plate is disposed at a position separated from the end of the rotor core. The plate includes slot parts, and air holes that penetrate the plate in the axial direction of the rotor shaft at areas adjacent to the rotor shaft. Protruding parts are provided on the shaft insulator on both sides of each air hole, extending in the axial direction of the rotor shaft and protruding radially outward with respect to the rotor shaft. The shaft insulator has an outer diameter D1 that is smaller than a diameter D2 of the plate in the slot parts adjacent to the rotor shaft.

20 Claims, 4 Drawing Sheets

ELECTRIC MOTOR AND ELECTRIC TOOL HAVING THE MOTOR

BACKGROUND OF THE INVENTION

1. Field of the Invention

The present invention relates to a power tool having a commutator motor, and particularly to the shape of end plates for a rotor in the commutator motor.

2. Description of the Related Art

Figure 1:
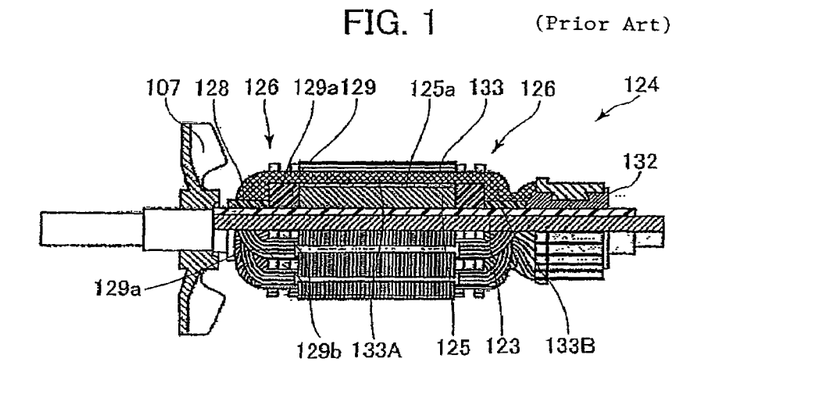
FIG. 1 is a partial cross-sectional view of a rotor used in a conventional power tool.

In Japanese patent application publication No. 2002-186216 discloses the rotor of a commutator motor. As shown in FIG. 1, a rotor 124 of such a commutator motor is provided with end plates 126. In addition to the end plates 126, the rotor 124 includes a rotor shaft 123, a rotor core 125, and a commutator 132. The rotor core 125 is fixed coaxially with the rotor shaft 123 and has rotor core slots 125a. The end plates 126 are coaxially fixed to the rotor shaft 123 on either axial end of the rotor core 125. The commutator 132 is coaxially fixed to the rotor shaft 123 on the side of one end plate 126, and a fan 107 is fixed coaxially to the rotor shaft 123 on the side of the other end plate 126

Each of the end plates 126 includes a plate 129 that contacts the rotor core 125, and a cylindrical shaft insulator 128. Slot parts 129a substantially identical in shape to the rotor core slots 125a are formed in the plate 129 at positions opposing the rotor core slots 125a. Grooves 129b are formed in the plate 129, in communication with adjacent slot parts 129a.

The rotor core slots 125a and slot parts 129a hold rotor coils 133. The rotor coils 133 include coil side bundles 133A and coil end bundles 133B. A power supply (not shown) supplies an electric current for rotating the rotor 124. The fan 107 rotates simultaneously with the rotor 124, blowing air for cooling the rotor coils 133 in which heat is produced by the electric current. The air passes through the air paths 27 and cools the first and second molded coils 22 and 23 in which heat is generated by the flowing current.

Japanese patent application publication No. HEI-1-283037 discloses another end plate structure for a commutator motor. This end plate includes a cylindrical shaft insulator, and a plate contacting the rotor core and having slot parts formed therein. Protrusions provided on the plate extend along edges of the slot parts toward the non-rotor core side. Protruding parts also protrude radially outward from the shaft insulator.

SUMMARY OF THE INVENTION

In the commutator motor used in a power tool, the end plate 126 described above includes the grooves 129b and increases the surface area for dissipating heat on the coil side bundles 133A of the rotor coils 133. While this improves the cooling performance of the fan, the structure still does not achieve sufficient cooling. Further, since the plate 129 is in contact with an end face of the core 125, heat from the rotor coils 133 conducted to the core 125 cannot be sufficiently dissipated. Therefore, the cooling performance of the rotor 124 cannot be greatly improved. Further, when winding the rotor coils 133 about the rotor core 125 and plate 129, tension in the winding can cause the plate 129 to shift in the circumferential direction.

In the end plate described in Japanese patent application publication No. HEI-1-283037, the rotor core must have a small outer diameter and numerous slot parts when using a small motor. Accordingly, the width of adjacent protrusions must be no greater than 3 mm, making it impossible to allocate sufficient width for adjacent protrusions. Therefore, when the coil is wound, the cross-sectional area in the space defined by the plate, protrusions, and coil and serving as the passage for fan-blown air is extremely small and not likely to achieve a sufficient cooling effect.

In view of the foregoing, it is an object of the present invention to provide an electric tool having a commutator motor that improves the cooling performance of the rotor.

In order to attain the above and other objects, the present invention provides a motor (a first type of a motor) including a stator, a rotor shaft, a rotor core, end segments, and rotor coils. The stator generates a magnetic field flux and has a hollow portion. The rotor shaft is rotatably disposed in the hollow portion and defining an axial direction The rotor core is coaxially fixed to the rotor shaft in the hollow portion and has a plurality of rotor core slots extending in the axial direction. The end segments are disposed on each end of the rotor core. The each segments includes a cylindrical shaft insulator in which the rotor shaft is inserted, and a plate extending radially outward from the shaft insulator with respect to the rotor core. The plate is formed with a plurality of slot parts substantially identical in shape to the rotor core slots at positions opposing the rotor core slots. The rotor coils are wound on the rotor core slots and the slot parts of the end segments.

The plate in at least one end segment is provided in a position separated from an axial end of the rotor core. The shaft insulator of the at least one end segment has a rotor core side part and a non-rotor core side part with respect to the plate. The rotor core side part of the shaft insulator has an outer diameter that is smaller than the diameter at the slot part of the plate adjacent to the rotor shaft.

In another aspect of the invention, there is provided an electric tool including a housing and the first type of the motor. The stator of the motor is accommodated in and fixed to the housing.

In another aspect of the invention, there is provided a motor (a second type of a motor) including a stator, a rotor shaft, a rotor core, first end segments, rotor coils, and a second end segment. The stator generates a magnetic field flux and has a hollow portion The rotor shaft is rotatably disposed in the hollow portion and defining an axial direction. The rotor core is coaxially fixed to the rotor shaft in the hollow portion and has a plurality of rotor core slots extending in the axial direction. The first end segments are disposed in contact with each end of the rotor core, and extends radially outward with respect to the rotor shaft. The first end segments are formed with a plurality of first slot parts substantially identical in shape to the rotor core slots at positions opposing the rotor core slots. The rotor shaft is inserted in the first end segments. The rotor coils are wound on the rotor core slots and the first slot parts. The second end segment is disposed on a side of one of the first end segments and at a position opposite to the rotor core. The second end segment includes a cylindrical shaft insulator in which the rotor shaft is inserted, and a plate extending radially outward from the shaft insulator with respect to the rotor core. The plate is formed with a plurality of second slot parts substantially identical in shape to the rotor core slots at positions opposing the rotor core slots.

The plate of the second end segment is provided in a position separated from the first end segment. The shaft insulator of the second end segment has a rotor core side part and a non-rotor core side part with respect to the plate. The rotor core side part of the shaft insulator has an outer diameter that is smaller than the diameter at the second slot part of the plate adjacent to the rotor shaft.

In another aspect of the invention, there is provided an electric tool including a housing and the second type of the motor. The stator of the motor is accommodated in and fixed to the housing.

DESCRIPTION OF THE PREFERRED EMBODIMENTS

A motor and an electric tool incorporating the motor according to preferred embodiments of the present invention will be described while referring to the accompanying drawings wherein like parts and components are designated by the same reference numerals to avoid duplicating description. The electric tool of the present invention is applied to a portable electric circular saw.

Figure 2:
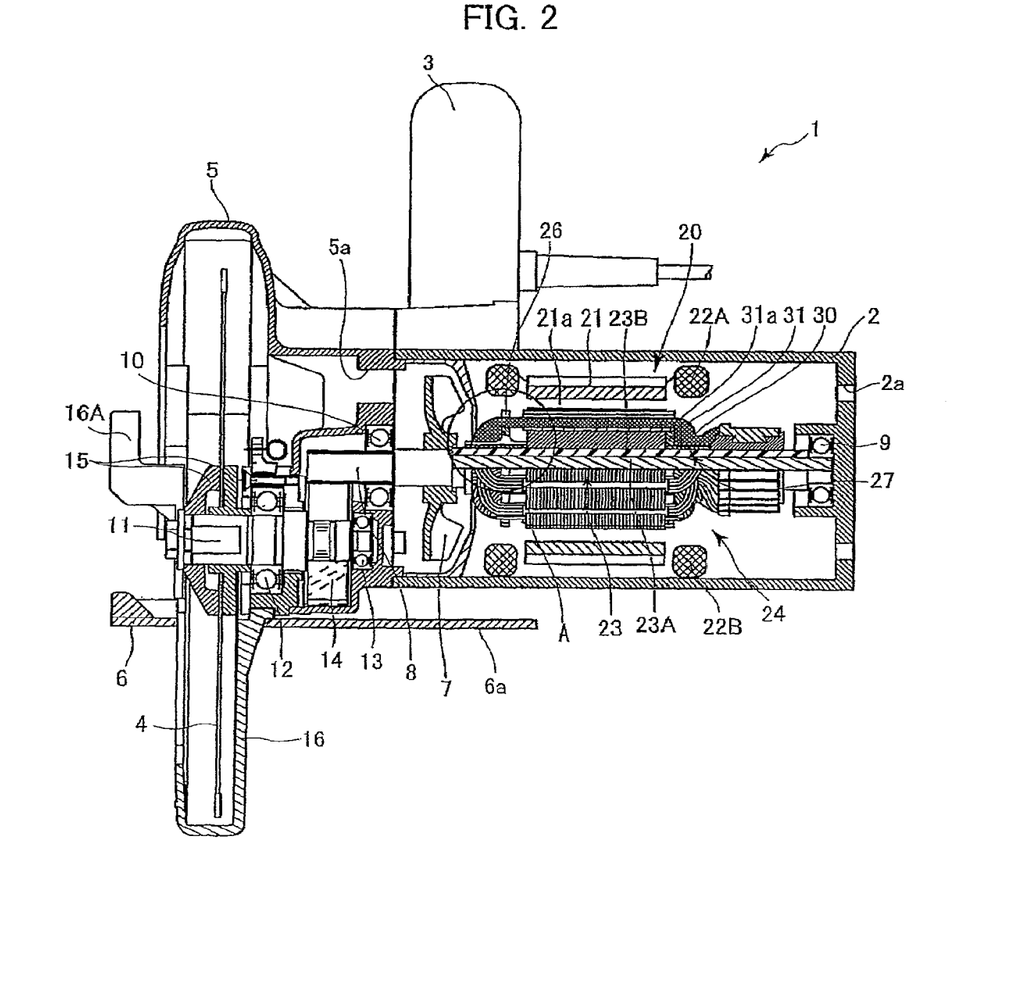
FIG. 2 is a vertical cross-sectional view showing a portion of a portable electric circular saw serving as a first embodiment of the present invention.

A motor and a portable electric circular saw incorporating the motor according to a first embodiment of the present invention will be described with reference to FIGS. 2 through 6. As shown in FIG. 2, a portable electric circular saw 1 includes a housing 2 which internally supports and houses a motor 20, a handle 3, a saw blade 4, a saw cover 5, a base 6, and a fan 7. An air inlet 2a which connects the interior and exterior of the housing 2 is formed on one end of the housing 2. The handle 3 is provided integrally with the housing 2 or linked to the housing 2 as a separate member. A switch (not shown) is provided to the handle 3 to control the drive of the motor 20. The saw blade 4 is rotatable in only a normal rotation direction which can be cut a workpiece. The saw cover 5 is mounted to the housing 2, and is shaped so as to cover the upper half of the periphery of the saw blade 4.

A fan airflow outlet 5a is formed on the saw cover 5 to discharge the fan airflow (not shown) The base 6 is connected to the housing 2 via the saw cover 5 and has a bottom surface 6a that slides on the workpiece. The base 6 is formed with an opening (not shown) through which the saw blade 4 is projected downward beyond the bottom surface 6a. The motor 20 has a stator core 21 formed with a hollow area 21a, stator coils 22A and 22B wound on the stator core 21, and a rotor 24 having a rotor shaft 23. The fan 7 is fixed to the rotor shaft 23 of the rotor 24 to cool the stator coils 22A and 22B and the rotor 24.

A pinion gear 8 is disposed at an end of the rotor shaft 23. The rotor shaft 23 and the pinion gear 8 are rotatably supported by first bearings 9 and 10. The first bearings 9 and 10 are provided on the air inlet 2a side of the housing 2 and on the saw cover 5, respectively. A drive shaft 11 extending parallel to the output shaft 26 is rotatably supported by second bearings 12 and 13 within the saw cover 5. The drive shaft 11 extends through the saw cover 5, and a gear 14 is coaxially fixed to the drive shaft 11. The gear 14 is in a meshing engagement with the pinion gear 8. A pair of saw blade locking members 15 are attached to the drive shaft 11. The saw blade locking members 15 are not rotatable relative to the drive shaft 11 and pinch the saw blade 4 therebetween.

The portable electric circular saw 1 further includes a safety cover 16 pivotably supported by the drive shaft 11. The safety cover 16 is adapted to cover substantially a lower half of the outer periphery of the saw blade 4 and can be retracted into the saw cover 5. The safety cover 16 has a lever 16a for manual pivotal movement operation. The safety cover 16 is urged by an urging member (not shown), such as a spring. FIG. 2 shows the initial state of the safety cover 16, where the most part of the safety cover 16 projects downward beyond the bottom surface 6a of the base 6 so as to prevent the outer periphery of the saw blade 4 from being exposed. When a cutting operation is conducted, the front end of the safety cover 16 abuts the rear end of the workpiece. As the user slides the portable electric circular saw 1 on the workpiece in the cutting direction, the safety cover 16 is pivotably moved about the drive shaft 11 and enters the saw cover 5 against the urging force of the urging member, exposing the saw blade 4 at the bottom surface 6a side of the base 6.

Figure 3:
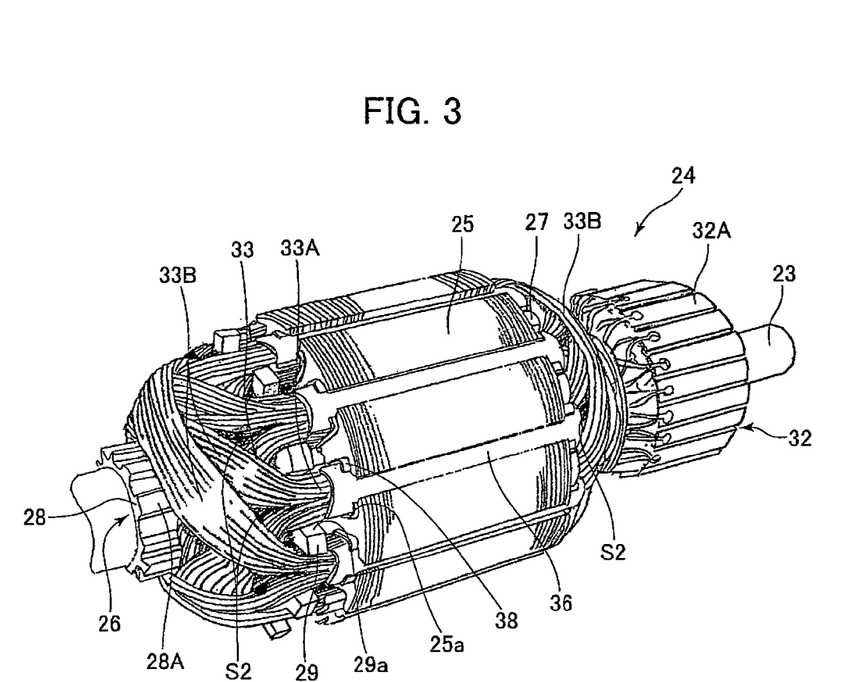
FIG. 3 is a perspective view of a rotor according to the first embodiment.
Figure 4:
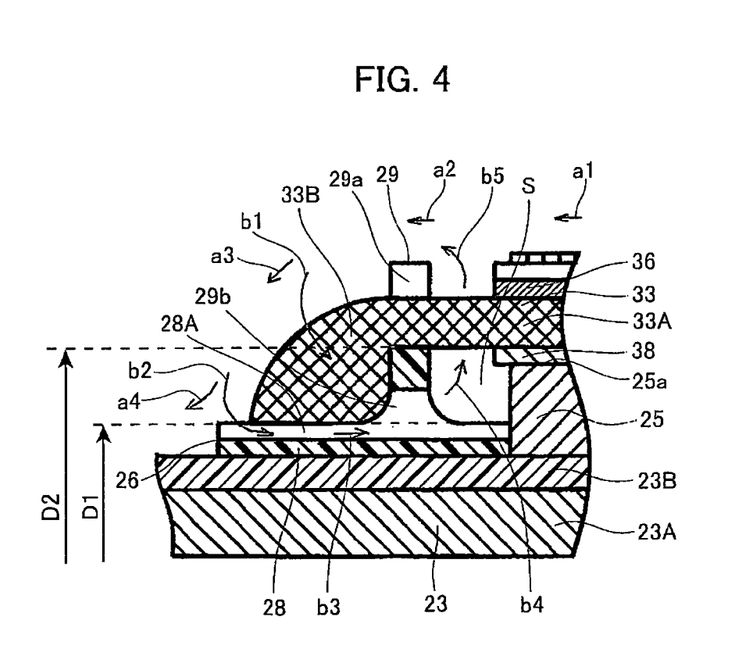
FIG. 4 is an enlarged view showing the part of the rotor indicated by A in FIG. 2.

Next, the rotor 24 will be described with reference to FIGS. 2 through 6. FIG. 3 is a perspective view of the rotor 24. FIG. 4 is an enlarged view showing the part of the rotor 24 indicated by A in FIG. 2 near the handle 3 side of the rotor shaft 23. The rotor shaft 23 includes a main rotor shaft body 23A, and a resinous member 23B covering the entire peripheral portion of the main rotor shaft body 23A. A rotor core 25 (see FIG. 3) is fixed coaxially with the rotor shaft 23 at a position inside the hollow area 21a of the stator core 21. A plurality of rotor core slots 25a is formed in the rotor core 25 extending in the axial direction of the rotor shaft 23. Rotor coils 33 described later are wound around the rotor core 25, passing through the rotor core slots 25a.

Figure 5:
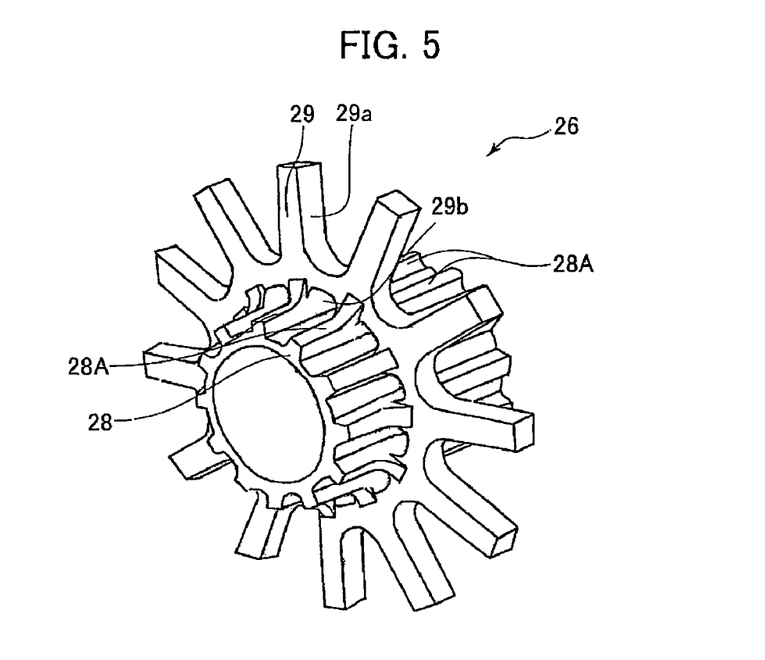
FIG. 5 is a perspective view of an end plate according to the first embodiment.

End plates 26 and 27 formed of an insulating plastic are fixed coaxially with the rotor shaft 23 on both axial ends of the rotor core 25. The end plate 26 is mounted on the end of the rotor core 25 near the fan 7, and the end plate 27 on the opposite end. As shown in FIG. 5, the end plate 26 on the fan 7 side includes a cylindrical shaft insulator 28, and a plate 29 extending radially from the shaft insulator 28 with respect to the rotor core 25. The side of the end plate 26 shown in the upper right of FIG. 5 opposes the rotor core 25. The plate 29 is disposed at a position separated from the end of the rotor core 25. Slot parts 29a shaped substantially identical to the rotor core slots 25a are formed in the plate 29 at positions opposing to the rotor core slots 25a.

Air holes 29b penetrate the plate 29 near the shaft insulator 28 in the axial direction of the rotor shaft 23. Protruding parts 28A extending in the axial direction of the rotor shaft 23 protrude from the shaft insulator 28 radially outward on both sides of each air hole 29b. As shown in FIG. 4, the shaft insulator 28 has an outer diameter D1 on the rotor core 25 side, while the plate 29 has a diameter D2 at the slot parts 29a near the shaft insulator 28 that is greater than the outer diameter D1. Hence, a space S can be allocated between the end face of the rotor core 25, the shaft insulator 28, and the plate 29.

Similar to the end plate 26, the end plate 27 on the end opposite the fan 7 has a shaft insulator 30 and a plate 31, as shown in FIG. 2. Slots 31a are formed in the plate 31. However, the shaft insulator 30 does not have protruding parts corresponding to the protruding parts 28A on the shaft insulator 28, and the plate 31 is disposed in contact with the end face of the rotor core 25. Further, the plate 31 does not have air holes corresponding to the air holes 29b.

As shown in FIG. 3, a commutator 32 is fixed coaxially with the rotor shaft 23 on the end of the rotor shaft 23 opposite the end on which the fan 7 is fixed. The commutator 32 has commutator pieces 32A of a number corresponding to an integral multiple of the number of rotor core slots 25a. The rotor coils 33 are retained in the rotor core slots 25a and slot parts 29a and have coil side bundles 33A and coil end bundles 33B.

Figure 6:
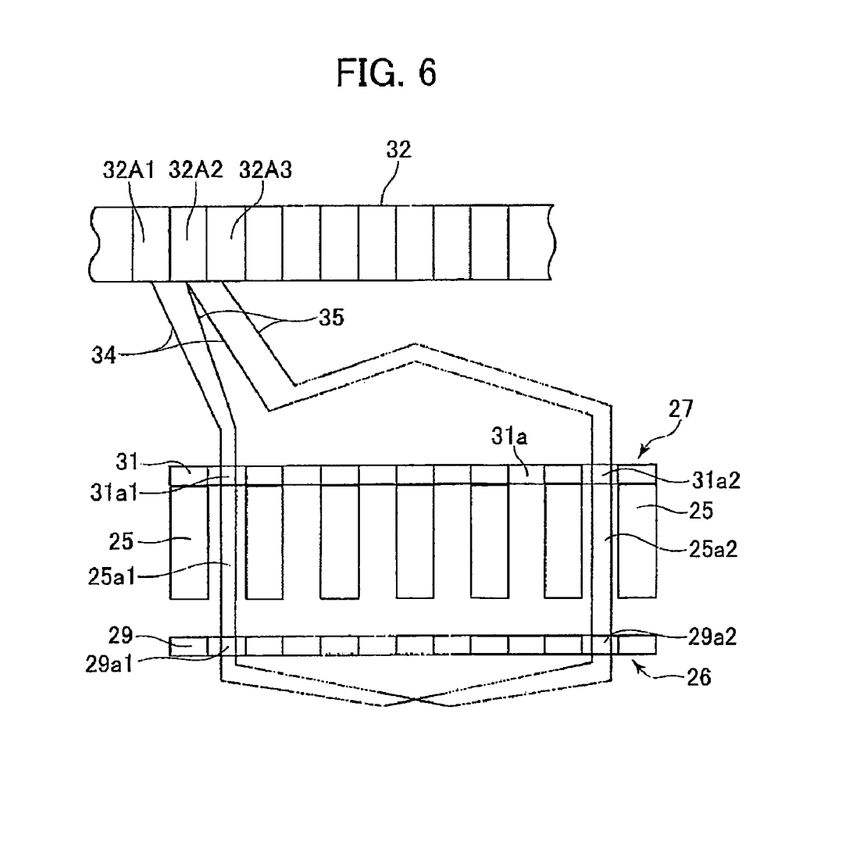
FIG. 6 is an explanatory diagram illustrating a method of forming a rotor coil according to the first embodiment.

Next, the method of forming the rotor coils 33 will be described with reference to FIG. 6. FIG. 6 is an explanatory diagram illustrating this method and shows an expanded view of the rotor core 25, end plates 26 and 27, and commutator 32.

As shown in FIG. 6, the commutator 32 has a first commutator piece 32A1, a second commutator piece 32A2, a third commutator piece 32A3, and the like. A first magnet wire 34 is connected to the first commutator piece 32A1. The first magnet wire 34 passes through a first slot 31a1, a first rotor core slot 25a1, and a second slot 29a1 aligned in the axial direction of the rotor shaft 23. After being led out through the second slot 29a1, the first magnet wire 34 subsequently passes through a third slot 29a2, a second rotor core slot 25a2, and a fourth slot 31a2. The first magnet wire 34 is repeatedly wound in this way through the first slot 31a1, first rotor core slot 25a1, second slot 29a1, third slot 29a2, second rotor core slot 25a2, and fourth slot 31a2 a prescribed number of windings (for simplification, only one winding is shown in FIG. 6) and is subsequently connected to the second commutator piece 32A2.

When winding the first magnet wire 34, tension in the winding applies a force to the plate 29 that works to shift the plate 29 circumferentially. However, the plate 29 is formed integrally with the shaft insulator 28. Further, the shaft insulator 28 is constructed longer than the plate 29 by an amount equivalent to the distance separating the plate 29 from the rotor core 25 and is fixed by being press fitted onto the rotor shaft 23. Hence, this construction prevents the shaft insulator 28 and the plate 29 from being shifted circumferentially by a force applied when winding the first magnet wire 34. In addition, the protruding parts 28A function as reinforcing ribs against the force of winding tension applied to the plate 29 to push the plate 29 toward the rotor core 25 when winding the first magnet wire 34, thereby enhancing the strength of the plate 29.

This winding process forms the coil side bundles 33A extending to the first slot 31a1, first rotor core slot 25a1, and second slot 29a1 and to the third slot 29a2, second rotor core slot 25a2, and fourth slot 31a2. The coil end bundles 33B are formed by leading from the second slot 29a1 to the third slot 29a2 and from the fourth slot 31a2 to the first slot 31a1. Both the coil side bundles 33A and the coil end bundles 33B constitute the rotor coil 33. As shown in FIG. 3, portions of the coil end bundles 33B contact the protruding parts 28A of the shaft insulator 28.

As shown in FIGS. 3 and 4, ends of the coil side bundles 33A are exposed because the plate 29 is separated from the rotor core 25 and because the outer diameter D1 of the shaft insulator 28 is smaller than the diameter D2 of the slot parts 29a of the plate 29. Hence, the effective heat dissipating surface area of the rotor coils 33 for dissipating heat generated by the electric current can be increased. Further, since the end face of the rotor core 25 is exposed, as shown in FIG. 4, it is possible to increase the heat dissipating surface area of the rotor core 25, which can reach high temperatures due to heat generated from copper loss in the rotor coils 33 and iron loss in the rotor core 25.

As shown in FIG. 6, one end of a second magnet wire 35 is connected to the second commutator piece 32A2. As with the first magnet wire 34, the second magnet wire 35 is also wound a prescribed number of times in a loop through the first slot 31a1, first rotor core slot 25a1, second slot 29a1, third slot 29a2, second rotor core slot 25a2, and fourth slot 31a2. The second magnet wire 35 is subsequently connected to the third commutator piece 32A3, forming the rotor coil 33.

A plurality of other rotor coils 33 are formed sequentially in the same way by winding magnet wires through the rotor core slots 25a and slot parts 29a and 31a. As shown in FIG. 3, gaps S2 are formed by the coil end bundles 33B. Further, slot liners 38 are interposed between the rotor core 25 and the rotor coils 33 to insulate them from one another. As shown in FIG. 4, the slot liners 38 are formed longer than the rotor core 25 in the axial direction so as to protrude a prescribed distance from the rotor core 25. Wedges 36 are interposed between the coil side bundles 33A and the outer radial ends of the rotor core 25 and slot liners 38. The wedges 36 prevent the coil side bundles 33A from protruding from the rotor core slots 25a.

Next, operation of the portable electric circular saw 1 will be described. When a switch (not shown) on the portable electric circular saw 1 is turned to the ON position, a power supply (not shown) supplies an electric current to the stator coils 22A and 22B and the rotor coils 33 through the commutator 32. The current generates a magnetic field between the stator coil 22A and stator coil 22B. The magnetic field and the current flowing through the rotor coils 33 generate a force that rotates the rotor 24. Rotations of the rotor 24 cause the rotor shaft 23 to rotate, and the rotational force of the rotor shaft 23 is transferred to the saw blade 4 via the pinion gear 8, gear 14, drive shaft 11, and saw blade locking members 15, whereby the saw blade 4 rotates in a normal direction for performing a cutting operation.

During the cutting operation, the rotations of the rotor shaft 23 also rotate the fan 7. The rotating fan 7 draws air into the housing 2 via the air inlet 2a. The air passes through the air paths and cools the stator coils 22A and 22B and the rotor coils 33 in which heat is generated by the flowing current. The fan airflow flows in the radial direction of the fan 7 and in the axial direction of the rotor 24, and is discharged from the fan airflow outlet 5a. As shown in FIG. 4, the flow of air generated by the fan passes between the stator core 21 and the rotor 24, as indicated by arrows a1 and a2. A portion of this air flows downward, as shown by an arrow a3, while another portion flows through the gaps S2 (see FIG. 3), as indicated by an arrow b1, because the protruding parts 28A near the rotor core 25 function as a fan when rotating. A portion of the fan air flowing in the direction indicated by a3 is exhausted from the end of the shaft insulator 28 through the fan airflow outlet 5a along the direction indicated by an arrow a4. The remainder of the air flowing in the direction indicated by a3 flows into and along the passage defined by the shaft insulator 28, protruding parts 28A, and coil end bundles 33B, indicated by arrows b2 and b3, for the same reason as the fan air indicated by the arrow b1. The airflow along arrows b2 and b3 cools the shaft insulator 28 side of the coil end bundles 33B.

Next, the fan-blown air passes through the air holes 29b and is flowed in the direction of arrows b4 and b5 by the rotation of the protruding parts 28A. The fan air following arrows b4 and b5 cools the exposed periphery of coil side bundles 33A on the ends thereof, as well as the rotor core 25, which reaches a high temperature due to heat generated from copper loss in the rotor coils 33 and iron loss in the rotor core 25. Hence, the cooling efficiency of the fan is greatly improved and is capable of suppressing heat rises in the rotor coils 33 and rotor core 25 and improving the rotational performance of the rotor 24. The end plates 26 and 27 of the preferred embodiment are easily manufactured through die molding or pressing, and the rotor coils 33 can also be formed according to the conventional methods. Accordingly, a rotor with excellent cooling performance can be provided at a low cost.

Figure 7:
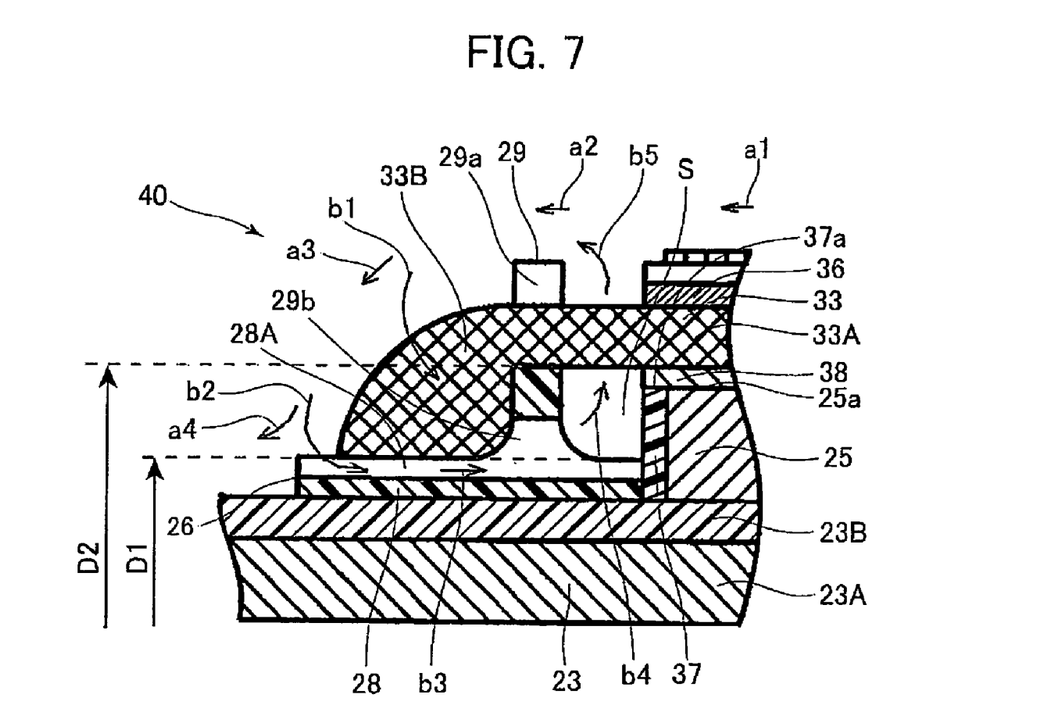
FIG. 7 is an enlarged view showing the part of the rotor indicated by A in FIG. 2 in a portable electric circular saw according to a second embodiment of the present invention.

Next, a motor and a portable electric circular saw incorporating the motor according to a second embodiment of the present invention will be described with reference to FIG. 7. FIG. 7 corresponds to FIG. 4 of the first embodiment and is an enlarged view of the circled region A in FIG. 2, wherein like parts and components are designated with the same reference numerals to avoid duplicating description.

As shown in FIG. 7, a rotor 40 according to the second embodiment has a positioning plate 37 formed of an insulating material. The positioning plate 37 is fixed coaxially to the rotor shaft 23 between the rotor core 25 and end plate 26 so as to contact an end face of the rotor core 25. In the second embodiment, the end plate 27 of the first embodiment is not provided on the commutator 32 side of the rotor core 25, while a positioning plate similar to the positioning plate 37 is provided on the other end face of the rotor core 25 on the commutator 32 side. The positioning plate 37 is shaped substantially identical to the plate 29. Positioning slots 37a substantially identical in shape to the rotor core slots 25a are formed in the positioning plate 37 at positions opposing to the rotor core slots 25a. The positioning slots 37a hold the coil side bundles 33A and support and position the slot liners 38 that protrude from the rotor core 25 a prescribed distance. Accordingly, the slot liners 38 can be easily positioned and can thereby improve insulation between the rotor core 25 and rotor coils 33.

As in the first embodiment described above, the periphery of the coil side bundles 33A in the second embodiment are exposed near the ends thereof, thereby increasing the effective heat dissipating area of the rotor coils 33 for dissipating heat generated by the electric current Further, a space S can be allocated between the positioning plate 37, the shaft insulator 28, and the plate 29. Accordingly, airflow generated along arrows b1-b5 by the rotation of the fan 7 contacts the positioning plate 37. In this way, the rotor core 25, which can reach high temperatures from heat generated due to copper loss in the rotor coils 33 and iron loss in the rotor core 25, can be cooled via the positioning plate 37, thereby improving the cooling efficiency of the fan-blown air and suppressing a rise in temperature in the rotor coils 33 and rotor core 25. As a result, it is possible to improve the rotating performance of the rotor 40.

While the invention has been described in detail with reference to specific embodiments thereof, it would be apparent to those skilled in the art that many modifications and variations may be made therein without departing from the spirit of the invention, the scope of which is defined by the attached claims.

For example, the end plate 27 on the commutator 32 side of the rotor core 25 may be formed in the same shape as the end plate 26 on the fan 7 side, or the positions of the end plate 27 and end plate 26 may be exchanged. Further, it is not necessary to provide the protruding parts 28A on the shaft insulator 28 of the end plate 26. Likewise, the air holes 29b formed in the plate 29 may be eliminated. Further, while the end plates 26 and 27 are formed of an insulating plastic, instead the end plates 26 and 27 may be manufactured of aluminum and coated entirely with an insulating layer, or may be configured of an insulating paper.

Further, while the stator coils 22A and 22B are configured of only a coil for rotating the cutting blade 4 in a forward direction, the stator coils 22A and 22B may have a brake coil for halting the rotation of the cutting blade 4. In this case, the length of the coil side bundles 33A is increased by the distance that the plate 29 is separated from the rotor core 25, thereby increasing the resistance of the rotor coils 33. Since this increase in resistance suppresses the electric brake current generated during braking, there is no need to add an external resistance for suppressing the brake current. Further, the protruding parts 28A extend along the axis of the rotor shaft 23 and protrude radially outward from the rotor shaft 23. However, the protruding parts 28A may be formed in a twisted shape around the periphery or may be formed partially irregular in order to create the fan effect.

Although an electromagnet is used for the stator, a permanent magnet may be used instead. In this case, the overload durability of the portable electric circular saw 1 is determined solely by the cooling performance of the rotor. Hence, by providing a rotor with a high cooling performance at a low cost, as described above, it is possible to substantially improve the durability of the portable electric circular saw 1. Further, the end plate 26 is only provided on the fan 7 side of the rotor core 25 in the second embodiment, but may be provided on the commutator 32 side as well. Further, in the second embodiment, a positioning plate similar to the positioning plate 37 is provided on the commutator 32 side of the rotor core 25, but the end plate 26 may be provided on this side instead.

What is claimed is:

1. An electric tool comprising:
   a housing;
   a stator accommodated in and fixed to the housing for generating a magnetic field flux, the stator having a hollow portion;
   a rotor shaft rotatably disposed in the hollow portion and defining an axial direction;
   a rotor core coaxially fixed to the rotor shaft in the hollow portion and having a plurality of rotor core slots extending in the axial direction;
   end segments disposed on each end of the rotor core, each segments comprising a cylindrical shaft insulator in which the rotor shaft is inserted, and a plate extending radially outward from the shaft insulator with respect to the rotor core, the plate being formed with a plurality of slot parts substantially identical in shape to the rotor core slots at positions opposing the rotor core slots; and
   rotor coils wound on the rotor core slots and the slot parts of the end segments;
   wherein the plate in at least one end segment is provided in a position separated from an axial end of the rotor core; and
   the shaft insulator of the at least one end segment has a rotor core side part and a non-rotor core side part with respect to the plate, the rotor core side part of the shaft insulator has an outer diameter that is smaller than the diameter at the slot part of the plate adjacent to the rotor shaft.

2. The electric tool according to claim 1, wherein a space is formed among the axial end of the rotor core, the plate, and the rotor core side part of the shaft insulator.

3. The electric tool according to claim 1, wherein the plate is formed with a plurality of air holes penetrating therethrough in the axial direction at a positions radially inward from the slot parts and radially outward from the shaft insulator.

4. The electric tool according to claim 1, further comprising a plurality of protruding parts protruding radially outward from the shaft insulators on at least one of the rotor core side part and the non-rotor core side part thereof.

5. The electric tool according to claim 1, further comprising slot liners disposed between the rotor coil and the rotor core for insulating the rotor coil and the rotor core, and a commutator coaxially fixed to the rotor shaft on a side of one of the end segments and at a position opposite to the rotor core, the commutator having commutator pieces.

6. A motor comprising:
a stator generating a magnetic field flux, the stator having a hollow portion;
a rotor shaft rotatably disposed in the hollow portion and defining an axial direction;
a rotor core coaxially fixed to the rotor shaft in the hollow portion and having a plurality of rotor core slots extending in the axial direction;
end segments disposed on each end of the rotor core, each segments comprising a cylindrical shaft insulator in which the rotor shaft is inserted, and a plate extending radially outward from the shaft insulator with respect to the rotor core, the plate formed with a plurality of slot parts substantially identical in shape to the rotor core slots at positions opposing the rotor core slots; and
rotor coils wound on the rotor core slots and the slot parts of the end segments;
wherein the plate in at least one end segment is provided in a position separated from an axial end of the rotor core; and
the shaft insulator of the at least one end segment has a rotor core side part and a non-rotor core side part with respect to the plate, the rotor core side part of the shaft insulator has an outer diameter that is smaller than the diameter at the slot part of the plate adjacent to the rotor shaft.

7. The motor according to claim 6, wherein a space is formed among the axial end of the rotor core, the plate, and the rotor core side part of the shaft insulator.

8. The motor according to claim 6, further comprising slot liners disposed between the rotor coil and the rotor core for insulating the rotor coil and the rotor core, and a commutator coaxially fixed to the rotor shaft on a side of one of the end segments and at a position opposite to the rotor core, the commutator having commutator pieces.

9. An electric tool comprising:
a housing;
a stator accommodated in and fixed to the housing for generating a magnetic field flux, the stator having a hollow portion;
a rotor shaft rotatably disposed in the hollow portion and defining an axial direction;
a rotor core coaxially fixed to the rotor shaft in the hollow portion and having a plurality of rotor core slots extending in the axial direction;
first end segments disposed in contact with each end of the rotor core, and extending radially outward with respect to the rotor shaft, the first end segments being formed with a plurality of first slot parts substantially identical in shape to the rotor core slots at positions opposing the rotor core slots, the rotor shaft being inserted in the first end segments;
rotor coils wound on the rotor core slots and the first slot parts; and
a second end segment disposed on a side of one of the first end segments and at a position opposite to the rotor core, the second end segment comprising a cylindrical shaft insulator in which the rotor shaft is inserted, and a plate extending radially outward from the shaft insulator with respect to the rotor core, the plate being formed with a plurality of second slot parts substantially identical in shape to the rotor core slots at positions opposing the rotor core slots;
wherein the plate of the second end segment is provided in a position separated from the first end segment; and
the shaft insulator of the second end segment has a rotor core side part and a non-rotor core side part with respect to the plate, the rotor core side part of the shaft insulator has an outer diameter that is smaller than the diameter at the second slot part of the plate adjacent to the rotor shaft.

10. The electric tool according to claim 9, wherein a space is formed among the first end segment, the plate, and the rotor core side part of the shaft insulator.

11. The electric tool according to claim 9, further comprising slot liners disposed between the rotor coil and the rotor core for insulating the rotor coil and the rotor core, and a commutator coaxially fixed to the rotor shaft on a side of one of the first end segment and the second end segment and at a position opposite to the rotor core, the commutator having commutator pieces.

12. A motor comprising:
a stator generating a magnetic field flux, the stator having a hollow portion;
a rotor shaft rotatably disposed in the hollow portion and defining an axial direction;
a rotor core coaxially fixed to the rotor shaft in the hollow portion and having a plurality of rotor core slots extending in the axial direction;
first end segments disposed in contact with each end of the rotor core, and extending radially outward with respect to the rotor shaft, the first end segments being formed with a plurality of first slot parts substantially identical in shape to the rotor core slots at positions opposing the rotor core slots, the rotor shaft being inserted in the first end segments;
rotor coils wound on the rotor core slots and the first slot parts; and
a second end segment disposed on a side of one of the first end segments and at a position opposite to the rotor core, the second end segment comprising a cylindrical shaft insulator in which the rotor shaft is inserted, and a plate extending radially outward from the shaft insulator with respect to the rotor core, the plate being formed with a plurality of second slot parts substantially identical in shape to the rotor core slots at positions opposing the rotor core slots;
wherein the plate of the second end segment is provided in a position separated from the first end segment; and
the shaft insulator of the second end segment has a rotor core side part and a non-rotor core side part with respect to the plate, the rotor core side part of the shaft insulator has an outer diameter that is smaller than the diameter at the second slot part of the plate adjacent to the rotor shaft.

13. The motor according to claim 12, wherein a space is formed among the first end segment, the plate, and the rotor core side part of the shaft insulator.

14. The motor according to claim 12, further comprising slot liners disposed between the rotor coil and the rotor core for insulating the rotor coil and the rotor core, and a commutator coaxially fixed to the rotor shaft on a side of one of the first end segment and the second end segment and at a position opposite to the rotor core, the commutator having commutator pieces.

15. The motor according to claim 6, wherein the plate is formed with a plurality of air holes penetrating therethrough in the axial direction at positions radially inward from the slot parts and radially outward from the shaft insulator.

16. The electric tool according to claim 9, wherein the plate of the second segment is formed with a plurality of air holes penetrating therethrough in the axial direction at positions radially inward from the slot parts and radially outward from the shaft insulator.

17. The motor according to claim 12, wherein the plate of the second end segment is formed with a plurality of air holes penetrating therethrough in the axial direction at positions radially inward from the slot parts and radially outward from the shaft insulator.

18. The electric tool according to claim 1, further comprising a fan coupled to the rotor shaft, wherein the electric tool is configured so as to enable improved cooling efficiency thereof by the fan and suppression of heat rise in the rotor coils and the rotor core.

19. The motor according to claim 1, further comprising a fan coupled to the rotor shaft, wherein the motor is configured so as to enable improved cooling efficiency thereof by the fan and suppression of heat rise in the rotor coils and the rotor core.

20. The electric tool according to claim 9, further comprising a fan coupled to the rotor shaft, wherein the electric tool is configured so as to enable improved cooling efficiency thereof by the fan and suppression of heat rise in the rotor coils and the rotor core.

* * * * *